United States Patent Office 2,993,880
Patented July 25, 1961

2,993,880
CROSS-LINKED MALEIC ANHYDRIDE MODIFIED PETROLEUM RESIN

Clyde Lee Aldridge, Baton Rouge, La., and Augustus Bailey Small, Westfield, N.J., assignors to Esso Research and Engineering Company, a corporation of Delaware
No Drawing. Filed Aug. 14, 1957, Ser. No. 678,036
1 Claim. (Cl. 260—78.4)

This invention relates to a method for improving the properties of cracked petroleum hydrocarbon resins and more particularly relates to a method of improving the softening properties of resins with no or only minor degradation of color, the olefin and diolefin reactants having at least five carbon atoms per molecule.

The present application is a continuation-in-part of Serial No. 475,834, filed December 16, 1954.

It is known that petroleum hydrocarbon resins can be produced from certain refinery streams containing olefins and diolefins by a variety of methods such as polymerization using Friedel-Crafts catalysts. The resins produced, however, have softening points that are generally too low for certain applications. For use as the binding ingredient in floor tile, for example, it is desirable that hydrocarbon resins have a minimum softening point of about 102° C. and preferably greater so that the floor tiles made therefrom have good hardness-indentation properties. Most of the resins that are produced from such hydrocarbon streams by Friedel-Crafts polymerization have softening points lower than 100° C. In some cases the resin softening point can be raised to about 100° C. by further stripping, but this process entails an undesirable loss of product in the form of volatile polymers removed by the stripping action. Heretofore all attempts to raise the softening points of these resins by means other than stripping have seriously degraded the color of the resins. Intensive stripping also badly degrades color. This is undesirable since light-colored resins are premium materials.

It has already been proposed in copending application Serial No. 610,893, filed September 20, 1956, which is a continuation-in-part of now abandoned Serial No. 448,357, filed August 6, 1954, in the name of John F. McKay and Joseph F. Nelson, to increase the softening point of steam-cracked resins by reacting the resin at elevated temperatures with a small amount of maleic anhydride.

In accordance with the present invention, it has been found that the softening point of the resins can be further increased by treating the maleic anhydride-resin adduct with certain cross-linking agents. This enables even harder resins to be obtained thus expanding the utility of the product.

Hydrocarbon resins to which the present invention is applicable are made by treating a hydrocarbon mixture containing 10 to 35% diolefins and 30 to 65% olefins and 0 to 60% aromatics, paraffins, and naphthenes with 0.25–2.5% of a Friedel-Crafts type catalyst such as aluminum chloride, aluminum bromide, boron trifluoride, and the like or solutions, slurries or complexes thereof. The reactions are conducted at temperatures in the range of —100 to +100° C. (preferably within the range of 0 to 100° C.). Residual catalyst is quenched by suitable methods, such as addition of methyl alcohol and subsequent filtration, water and/or caustic washing and the final solution is then stripped of unreacted hydrocarbons and low molecular weight oils by vacuum and/or steam distillation. The product is a substantially non-aromatic unsaturated hydrocarbon resin. A hydrocarbon mixture suitable for resin production is conveniently found in hydrocarbon streams obtained by steam cracking gas oils. These mixtures have boiling ranges between 20° and 280° C., or may be composed of any intermediate fraction, e.g. as in the range of about 30 to 130° C. A typical stream shows 20% diolefins, 51% olefins, 27% aromatics, and 2% paraffins and naphthenes. The preparation of these petroleum resins, as they are called herein, is further described in a co-pending patent application, Serial No. 295,836, filed June 26, 1952, now U.S. Patent 2,698,841, patented January 4, 1955.

According to the preferred method of carrying out the present invention, the hydrocarbon resin, prepared as described above, is placed in an agitated reactor together with at least 1% of the maleic anhydride. A catalyst such as tertiary butyl hydroperoxide or ditertiary butyl peroxide may be used, if desired, but is not necessary. Oxygen is excluded by passing a slow stream of nitrogen through the vented reactor. Although nitrogen has been cited as a blanketing agent, other gases such as carbon dioxide or hydrocarbons may be used. If color is not an important consideration, oxygen does not have to be excluded. The temperature is maintained above about 130° C. up to about 275° C., until the desired increase in softening point is attained. The reaction should be carried out under pressure as the temperature is raised to above 200° C.

It is important that the temperature be maintained above about 130° C. since at lower temperatures no reaction takes place. However, care should be taken that the temperature does not exceed the decomposition temperature of the resin.

Materials suitable to be reacted with the above-treated resins are the polyhydric alcohols such as ethylene glycol, propylene glycol, glycerine, etc.; amino alcohols, such as ethanol amine, triethanolamine, 2-(hydroxymethyl) propane diol-1,3, aminophenols and the like; hydrazines, such as diamide or its alkyl derivatives such as methyl or ethyl hydrazine and thioglycols, such as monothioglycol, thiodiglycol and the like. The reaction is carried out at temperatures between 125° and 250° C. Any amount of the above compounds can be used from about 0.1 up to about one mole per 2 moles of available COOH or equivalent groups on the treated resin.

While it is not desired to limit the invention by any theory of the reactions involved, it is believed that the following represents the course of the reactions:

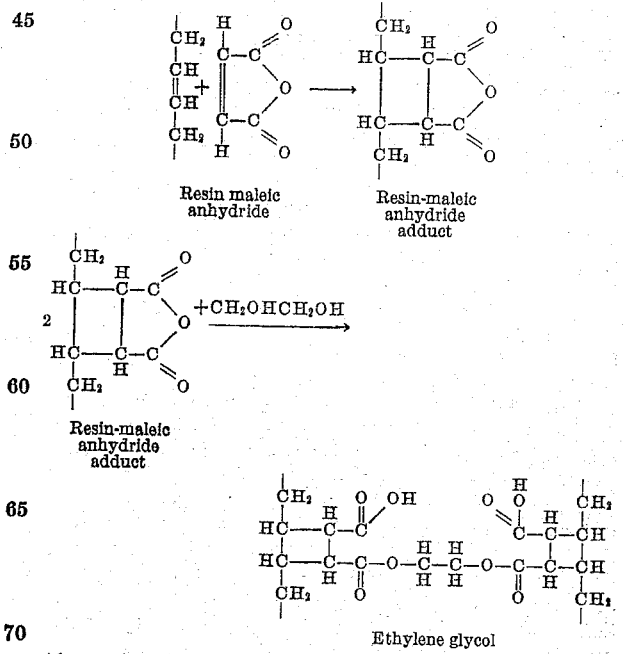

Alternatively, the reaction may occur with conjugated unsaturation.

Thus in the first step the resin adds to the maleic anhydride to form the adduct. Two molecules of the adduct then react with one ethylene glycol molecule. The polymer thus treated contains controlled amounts of polar groups which are also subject to oxidation, polymerization, esterification, and acetal and ketal formation in the process of finishing with the result that products are obtained with greatly increased hardness.

The following examples will serve to illustrate the mode of operation as well as the advantages of the present invention, though it will be understood that various other embodiments or modifications not specifically illustrated herein are possible without departing from the spirit or scope of the invention.

EXAMPLE I

A hydrocarbon stream which, according to analysis, consisted approximately of 14% dienes, 42% olefins, and 42% aromatics and saturated hydrocarbons and boiled between 30 and 130° C., prepared by steam cracking of a gas oil, was polymerized in the presence of aluminum chloride at a temperature of 20° C. A hydrocarbon resin was obtained in 25% yield having a softening point of 93° C. The resin was recovered by stripping off the unreacted hydrocarbons by vacuum distillation. The hydrocarbons reacted were in the $C_5$ to $C_8$ range and thus substantially free of butadiene and of butenes.

EXAMPLE II

The resin of Example I was heated for 24 hours at 235° C. with 5% by weight of maleic anhydride in a glass flask fitted with a stirrer and a water-cooled reflux condenser. A slow stream of nitrogen was continuously passed through the reactor. A resin having a softening point of 107° C. was recovered.

EXAMPLE III

The modified resin of Example II was reacted with the theoretical amount of ethylene glycol, i.e. 1 mole of glycol per 2 moles of anhydride, for 5.5 hours at 195° C. under a nitrogen blanket. The temperature was then raised to 230° C. and the reaction continued for 16 hours. A resin having a softening point of 111° C. was obtained.

The softening points of the resins of the above examples were obtained under the same stripping conditions which are maximum without degradation of the resin. No solvent was used and care was taken to avoid any stripping action by the nitrogen blanket.

From the above examples it is evident that the softening points of the resins have been significantly raised and that their utility in floor tile and similar applications where high softening point is important has been enhanced.

The petroleum resins modified in accordance with the present invention are distinguishable from unsaturated oils and resins formed from mixtures of lower boiling unsaturated hydrocarbons, such as butenes and butadiene. For example, U.S. Patent 2,142,980 describes unsaturated oils formed from butadiene and isobutene at below 0° C. and modified by reaction with an excess of a maleic anhydride to produce a lubricating oil additive. U.S. Patent 2,634,256 describes the formation of a highly unsaturated brittle resin by copolymerizing butadiene with diisobutylene and modifying the resin by reaction with relatively large amounts of maleic anhydride, e.g. 30 parts per 100 parts of the copolymer.

It has been found that in modifying the petroleum resins in accordance with the present invention, the use of 10 wt. percent maleic anhydride (10 parts of anhydride per 100 parts of the petroleum resin) results in a deleterious contamination of the resin by dark degradation products and adversely effects the economics of the process. Accordingly, it is found that the petroleum resin should be reacted with only from 1 to 10 wt. percent of maleic anhydride at a temperature in the range of 130 to 275° C. The contaminants which are formed by using more than 10 wt. percent maleic anhydride are reddish-brown to black substances which are termed char. The char is insoluble in ordinary organic solvents. The presence of the char greatly reduces the value of the resins for use as a surface coating and many other applications. In accordance with the present invention, a petroleum resin prepared and described in Example I is reacted with a restricted amount of maleic anhydride, essentially not more than 10 wt. percent of maleic anhydride whereby the softening point of the resulting modified resin is increased a moderate amount without formation of char following, then the resulting modified resin product is cross-linked by reaction with a cross-linking reactant such as ethylene glycol which condenses with the carboxy groups attached to the petroleum resin maleic anhydride adduct. As a typical demonstration of the present invention, samples of petroleum resin formed as described in Example I were reacted with varied quantities of maleic anhydride. The effects are shown in the following table:

*Table 1*

SOFTENING POINT OF PETROLEUM RESIN UNTREATED, 93° C.

| Wt. Percent of Maleic Anhydride in Adduct with Petroleum Resin | Reaction Temperature, ° C. | Softening Point |
|---|---|---|
| 1½ | 225 | 94.4 |
| 5 | 200 | 107 |
| 10 | 200 | 104 |

Char began to become quite noticeable on reacting 10% and higher proportions of maleic anhydride and with no benefit toward the increase of the softening point. Thus, the best results were found to be obtained in using from about 2 to 8% of a maleic anhydride with peak benefits at about 5% as described in Examples II and III.

The nature of the present invention having been thus fully set forth and specific examples of the same given, what is claimed as new and useful and desired to be secured by Letters Patent is:

A process for raising the softening point of a cracked petroleum resin prepared by a Friedel-Crafts catalyst polymerization of a steam cracked petroleum fraction boiling in the range of 30° to 130° C. with from .25 to 2.5 wt. percent of a Friedel-Crafts catalyst at a temperature between −100° and +100° C., said fraction containing hydrocarbons in the $C_5$–$C_8$ range that are principally olefin, diolefin, and aromatic hydrocarbons, which comprises reacting the resulting petroleum resin at a temperature in the range of 130° to 275° C. with 2 to 8% by weight of maleic anhydride to form a maleic anhydride adduct of the resin with no substantial formation of char, then reacting about 0.1 to 1.0 mole of ethylene glycol per mole of maleic anhydride combined in the adduct maleic anhydride thus combined, said ethylene glycol being reacted with the adduct at a temperature in the range of 125° to 250° C. to obtain a cross-linked product having a higher softening point without degradation of the resulting modified resin.

References Cited in the file of this patent

UNITED STATES PATENTS

| | | |
|---|---|---|
| 2,142,980 | Huijser et al. | Jan. 3, 1939 |
| 2,230,005 | Moser | Jan. 28, 1941 |
| 2,404,411 | Stephens et al. | July 23, 1946 |
| 2,468,769 | Morris et al. | May 3, 1949 |
| 2,634,256 | Sparks et al. | Apr. 7, 1953 |
| 2,662,874 | Brown | Dec. 15, 1953 |

FOREIGN PATENTS

| | | |
|---|---|---|
| 407,957 | Great Britain | Mar. 19, 1934 |